(12) United States Patent
Yokoi et al.

(10) Patent No.: US 10,266,108 B2
(45) Date of Patent: Apr. 23, 2019

(54) BODY STRUCTURE OF VEHICULAR REAR LAMP ATTACHMENT PORTION

(71) Applicant: TOYOTA JIDOSHA KABUSHIKI KAISHA, Toyota-shi (JP)

(72) Inventors: Yoshimitsu Yokoi, Toyota (JP); Kohei Miyazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 147 days.

(21) Appl. No.: 14/610,326

(22) Filed: Jan. 30, 2015

(65) Prior Publication Data

US 2015/0217682 A1    Aug. 6, 2015

(30) Foreign Application Priority Data

Feb. 4, 2014    (JP) .................. 2014-019330

(51) Int. Cl.
*B60Q 1/22*    (2006.01)
*B60Q 1/30*    (2006.01)
(Continued)

(52) U.S. Cl.
CPC .............. *B60Q 1/30* (2013.01); *B60Q 1/22* (2013.01); *B60Q 1/2619* (2013.01); *B60Q 1/44* (2013.01);
(Continued)

(58) Field of Classification Search
CPC .. B60Q 1/2619; B60Q 1/2623; B60Q 1/2626; B60Q 1/2638; B60Q 1/2642; B60Q 1/30; B60Q 1/44; B60Q 1/50; B62D 25/08; F21S 48/1109; F21S 48/20; F21S 48/21; F21S 48/211; F21S 48/212
(Continued)

(56) References Cited

U.S. PATENT DOCUMENTS 3,809,880 A * 5/1974 Daumueller ............ F21S 48/23
362/297
4,912,606 A * 3/1990 Yamamoto ........... B60Q 1/2607
362/309
(Continued)

FOREIGN PATENT DOCUMENTS

CN    2803813 Y    8/2006
DE    19926842    *  6/1999    ........... B60Q 1/0683
(Continued)

OTHER PUBLICATIONS

English Machine Translation of JPH10226360 from ESPACENET.*
English Machine Translation of DE 19926842.*

*Primary Examiner* — Zheng Song
(74) *Attorney, Agent, or Firm* — Oblon, McClelland, Maier & Neustadt, L.L.P.

(57) ABSTRACT

A body structure of a vehicular rear lamp attachment portion includes a drawing structural surface of a side outer panel and a housing panel. The drawing structural surface is provided at both end portions of a vehicle rear end portion in a vehicle width direction, is drawn inward in the vehicle width direction, and has a fixed surface at a rear end of the drawing structural surface. A housing panel has a side surface portion and a front end portion. The side surface portion extends forward in a vehicle longitudinal direction. The front end portion is joined to the fixed surface.

7 Claims, 6 Drawing Sheets

(51) Int. Cl.
*B60Q 1/44* (2006.01)
*B60Q 1/50* (2006.01)
*B60Q 1/26* (2006.01)
*B62D 25/08* (2006.01)
*F21W 103/35* (2018.01)
*F21W 103/40* (2018.01)

(52) U.S. Cl.
CPC .............. *B60Q 1/50* (2013.01); *B62D 25/087* (2013.01); *B60Q 2400/00* (2013.01); *F21W 2103/35* (2018.01); *F21W 2103/40* (2018.01)

(58) Field of Classification Search
USPC ................................. 362/498, 546, 548, 549
See application file for complete search history.

(56) References Cited

U.S. PATENT DOCUMENTS

| | | | | |
|---|---|---|---|---|
| 5,455,747 | A * | 10/1995 | Aoyama .............. | B60Q 1/2607 359/19 |
| 6,068,390 | A * | 5/2000 | Iwasaki .................... | B60Q 1/28 362/487 |
| 6,332,697 | B2 * | 12/2001 | Soga ............................. | 362/365 |
| 2002/0101734 | A1 * | 8/2002 | Tokida .................. | F21S 48/215 362/245 |
| 2009/0231870 | A1 * | 9/2009 | Zavala ................. | B60Q 1/0441 362/487 |
| 2010/0124073 | A1 * | 5/2010 | Kowalczyk .......... | B60Q 1/2607 362/545 |
| 2013/0250601 | A1 * | 9/2013 | Ito ........................ | B60Q 1/0064 362/544 |
| 2014/0334176 | A1 * | 11/2014 | Maeshima ........... | B60Q 1/2638 362/520 |
| 2015/0009697 | A1 * | 1/2015 | Kawamura .............. | B60Q 1/30 362/516 |

FOREIGN PATENT DOCUMENTS

| | | | | |
|---|---|---|---|---|
| JP | H10226360 | * | 2/1997 | ............. B62D 25/08 |
| JP | 2002 234384 | | 8/2002 | |
| JP | 2003 16812 | | 1/2003 | |

* cited by examiner

BODY STRUCTURE OF VEHICULAR REAR LAMP ATTACHMENT PORTION

INCORPORATION BY REFERENCE

The disclosure of Japanese Patent Application No. 2014-019330 filed on Feb. 4, 2014 including the specification, drawings and abstract is incorporated herein by reference in its entirety.

BACKGROUND OF THE INVENTION

1. Field of the Invention

The present invention relates to a body structure of a vehicular rear lamp attachment portion.

2. Description of Related Art

Japanese Patent Application Publication No. 2002-234384 (JP 2002-234384 A) discloses an attachment structure of a vehicular lamp. In the structure, at least two engagement portions are provided along one side end portion of the lamp with a specified gap being interposed therebetween. The two engagement portions are engaged with a vehicle body, so that the one side end portion of the lamp is positioned in an engagement direction of the engagement portions and that the lamp is attached to the vehicle body. In JP 2002-234384 A, an auxiliary engagement portion is provided between the two engagement portions of the lamp. The auxiliary engagement portion is engaged with the vehicle body in the engagement direction of the engagement portions and can adjust an engagement position thereof along the engagement direction of the engagement portions.

Japanese Patent Application Publication No. 2003-016812 (JP 2003-016812 A) discloses a vehicular lamp that has a function as a rear side marker lamp in addition to a function as a rear lamp. A bulb is directed forward and attached to a housing, and irradiation light of the bulb is partially emitted to the side as rear side marker light through an outer lens. In JP 2003-016812 A, plural prism steps are provided on a back surface of a rear reflex reflector that is arranged between the bulb and an outer lens portion in front of the bulb. The plural prism steps reflect incident light from the bulb as the rear side marker light to the outer lens portion on the side.

Here, drawing depth of a side outer panel in a vehicle width direction is limited due to a design restriction, a restriction during a process, or the like. For this reason, it has been difficult to arrange a light source in a side portion of a rear combination lamp, the side portion advancing to the side outer panel side. Therefore, it has been difficult to include the side portion of the rear combination lamp, which advances to the side outer panel side, in a light emitting region for a purpose of improved design or the like.

SUMMARY OF THE INVENTION

The present invention provides a body structure of a vehicular rear lamp attachment portion.

A body structure of a vehicular rear lamp attachment portion according to an aspect of the present invention includes a drawing structural surface of a side outer panel and a housing panel. The drawing structural surface is provided at both end portions of a vehicle rear end portion in a vehicle width direction, is drawn inward in the vehicle width direction, and has a fixed surface at a rear end of the drawing structural surface. The housing panel has a side surface portion and a front end. The side surface portion extends forward in a vehicle longitudinal direction, and the front end portion is joined to the fixed surface.

In the above construction, the side surface portion of the housing panel extends forward in the vehicle longitudinal direction, and the front end portion thereof is joined to the fixed surface that is provided at the rear end of the drawing structural surface of the side outer panel. When a light source is arranged in the side surface portion, drawing depth of the side surface portion needs to be increased to allow arrangement of the light source due to the thickness of a light source. Here, the housing panel can be drawn deeper than the side outer panel since the housing panel has no design restriction or a relatively less design restriction. Thus, the light source can be arranged in the side surface portion.

For this reason, the light source can be arranged to a side portion that reaches to a vehicle side portion. As a result, a light emitting region reaches to the side portion that reaches to the vehicle side portion.

In the body structure according to the aspect of the present invention, the housing panel may have a rear surface portion. The rear surface portion may be curved from a rear end of the side surface portion and extend inward in the vehicle width direction and rearward in the vehicle longitudinal direction.

In the above construction, the housing panel has the rear surface portion that is curved from the rear end of the side surface portion and that extends inward in the vehicle width direction and rearward in the vehicle longitudinal direction. Just as described, the rear surface portion extends inward in the vehicle width direction and rearward in the vehicle longitudinal direction. Thus, for example, compared to the case where the rear surface portion extends along the vehicle width direction, drawing depth of the entire housing panel can be suppressed from increasing. Therefore, according to the body structure according to the aspect of the present invention, shaping of the housing panel is relatively easy.

In the body structure according to the aspect of the present invention, a height of the side surface portion of the housing panel in a vehicle vertical direction may be reduced from the rear end of the side surface portion to a front end of the side surface portion in the vehicle longitudinal direction.

In the above construction, the height of the side surface portion of the housing panel in the vehicle vertical direction is reduced from the rear end of the side surface portion to the front end of the side surface portion in the vehicle longitudinal direction. Therefore, assemblability is enhanced when the vehicular rear lamp is attached to the vehicular rear lamp attachment portion from a vehicle rear side to a vehicle front side.

In the body structure according to the aspect of the present invention, the fixed surface of the side outer panel may have a reference hole. In addition, the drawing structural surface may have an attachment hole to which the vehicular rear lamp is attached.

In the above construction, the fixed surface of the side outer panel has the reference hole, and the drawing structural surface has the attachment hole to which the vehicular rear lamp is attached. Accordingly, for example, compared to the case where the fixed surface has both of the reference hole and the attachment hole, a height of the fixed surface in the vehicle vertical direction can be reduced. Thus, in the vehicle longitudinal direction, a range of the drawing structural surface of the side outer panel can be reduced in accordance with the reduction of the height of the fixed surface in the vehicle vertical direction. Therefore, the light source that is arranged in the side surface portion can be arranged further to the vehicle front side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 2:
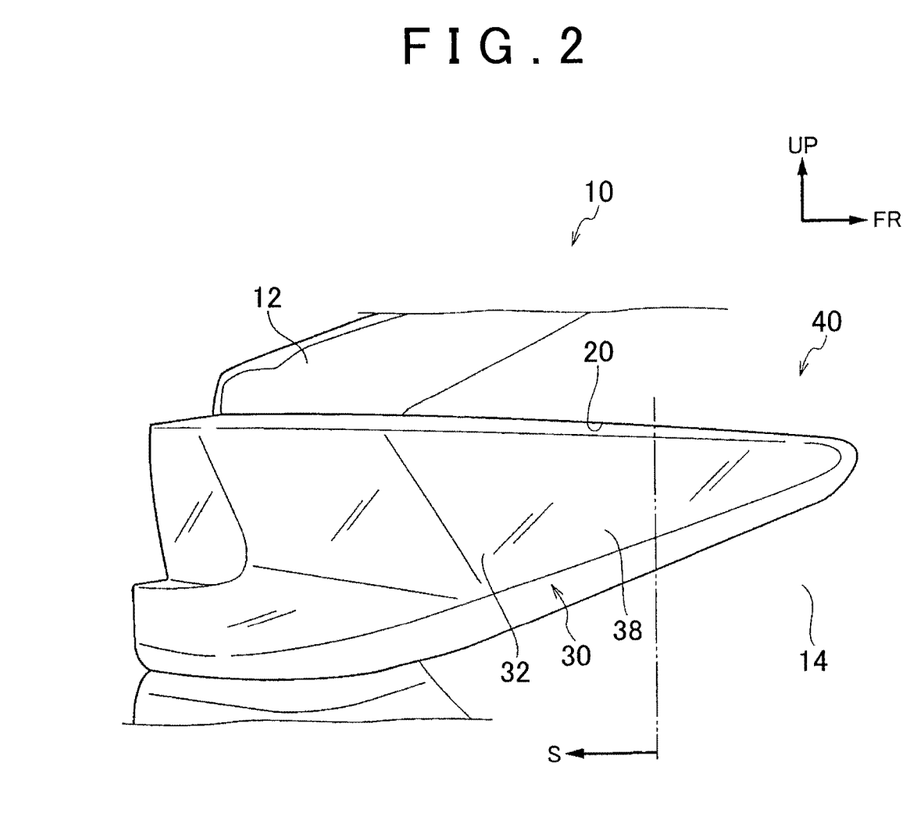
FIG. 2 is a side view of a state that a rear combination lamp is attached to a rear lamp attachment portion in FIG. 3.
Figure 3:
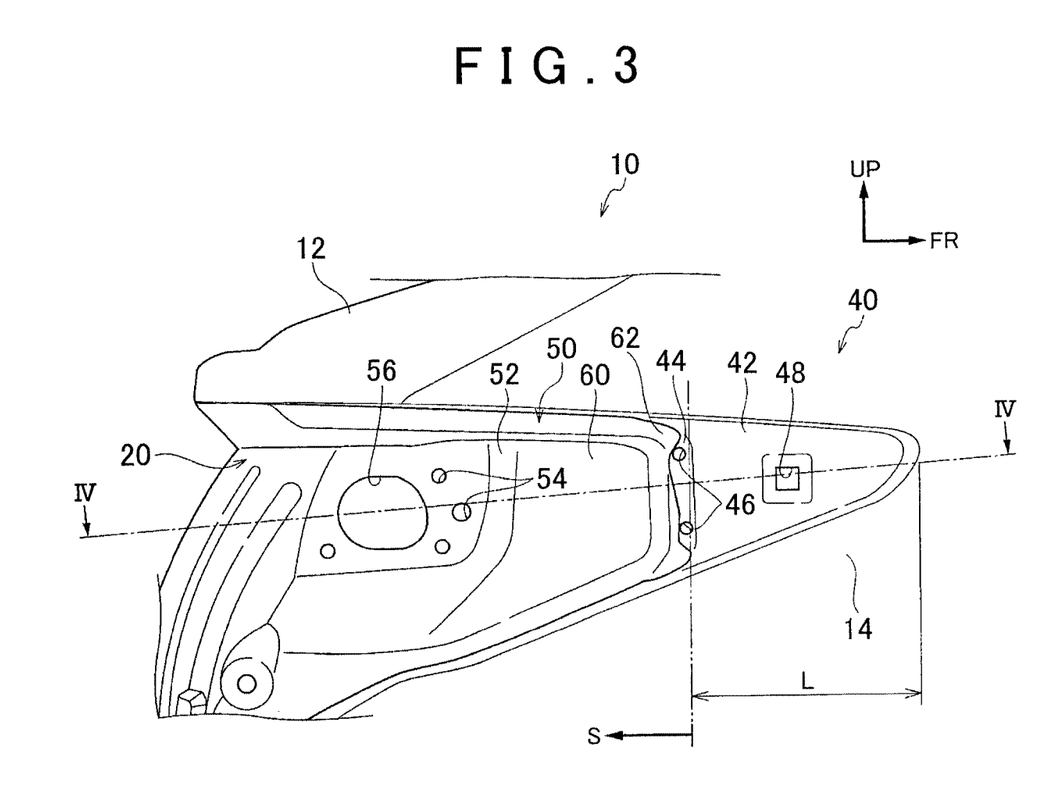
FIG. 3 is a side view of the body structure of the vehicular rear lamp attachment portion according to the embodiment of the present invention.
Figure 4:
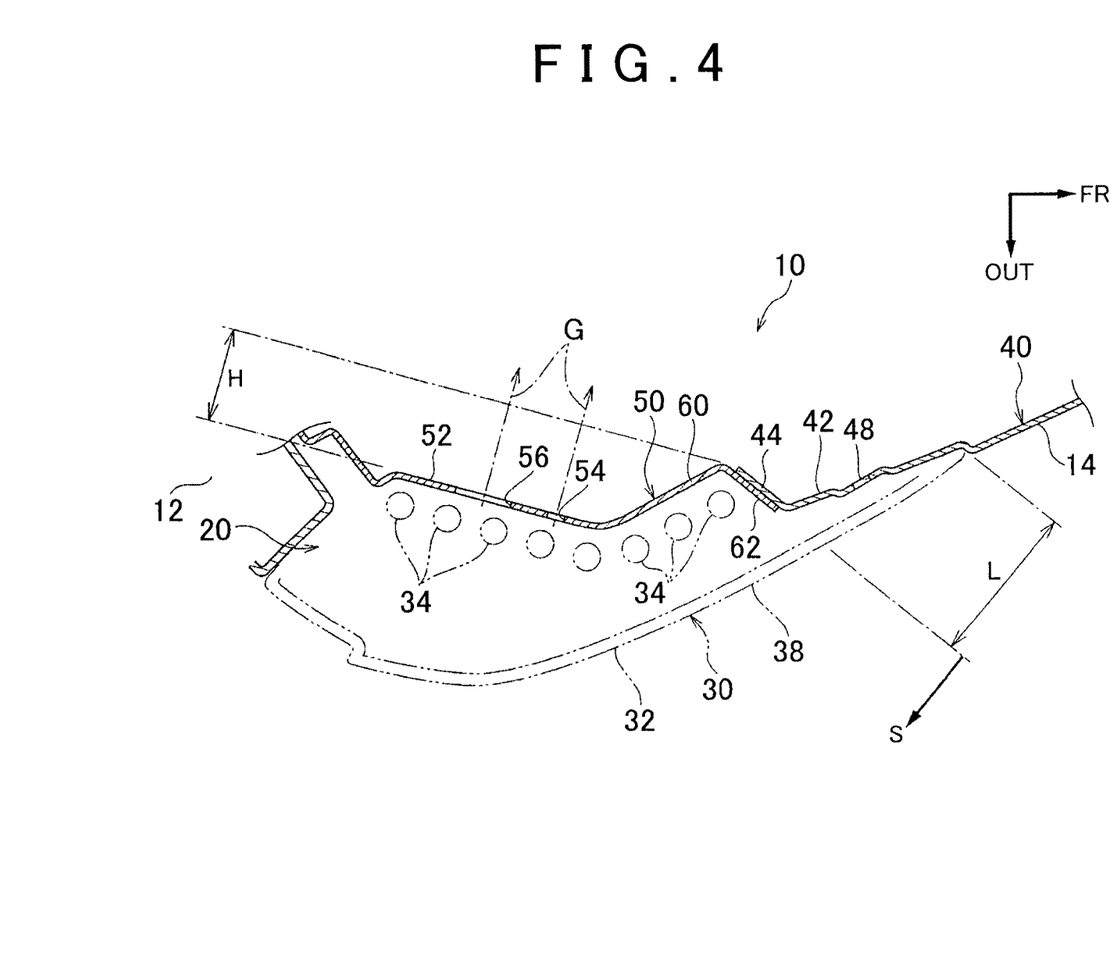
FIG. 4 is a horizontal cross-sectional view that is taken along line IV-IV in FIG. 3.

A description will be made on a body structure of a vehicular rear lamp attachment portion according to one embodiment of the present invention by using FIG. 1 to FIG. 4. Noted that an arrow FR, an arrow UP and an arrow OUT are appropriately depicted in these drawings. The arrow FR indicates a front side in a vehicle longitudinal direction. The arrow UP indicates an upper side in a vehicle vertical direction. The arrow OUT indicates an outer side in a vehicle width direction. In addition, FIG. 2 to FIG. 4 depict the vehicular rear lamp attachment portion on a right side of a vehicle when the vehicle is seen from the rear. The vehicular rear lamp attachment portion on a left side of the vehicle has the same structure as the vehicular rear lamp attachment portion on the right side except that the structure is symmetrical.

Figure 1:
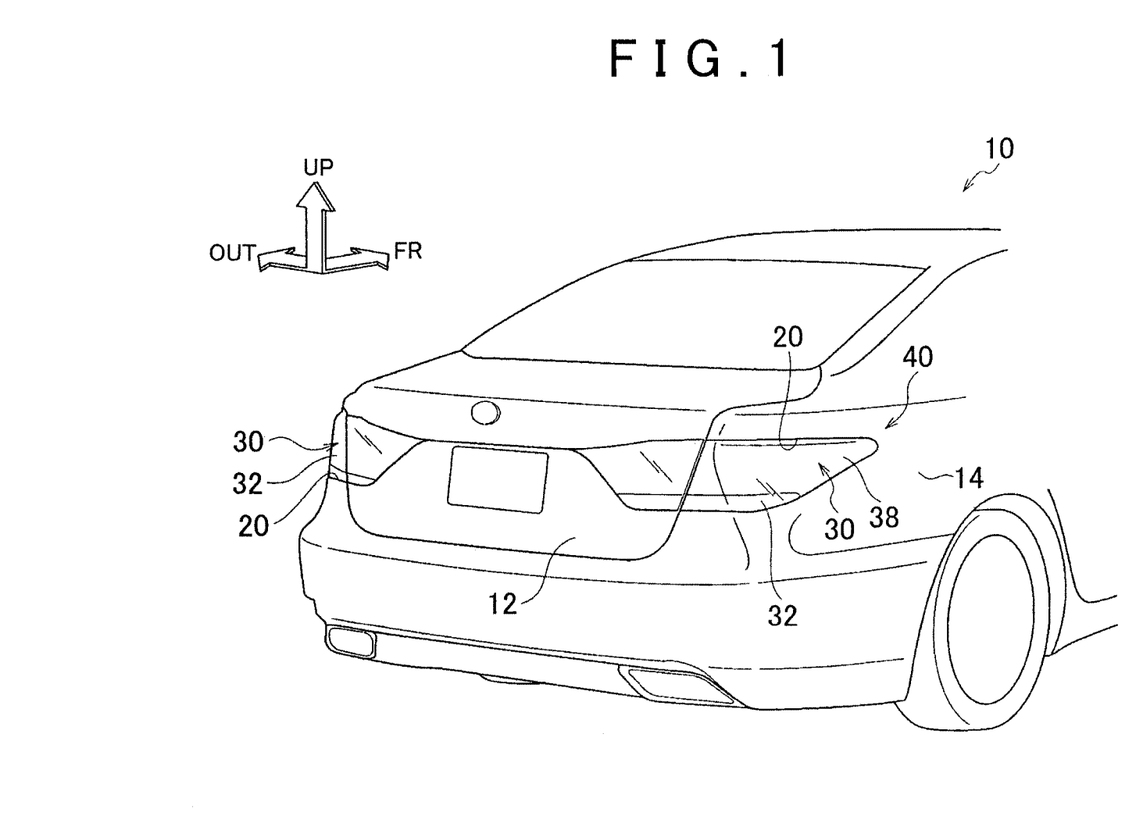
FIG. 1 is a perspective view of a rear portion of a vehicle, to which a body structure of a vehicular rear lamp attachment portion according to one embodiment of the present invention is applied.

As depicted in FIG. 1, a rear lamp attachment portion 20 is provided on both side end portions of a rear end portion 12 of a vehicle 10 in the vehicle width direction, and the rear lamp attachment portion 20 is recessed inward in the vehicle width direction (also see FIG. 3 and FIG. 4). A rear combination lamp 30 that is one example of the vehicular rear lamp is attached to this rear lamp attachment portion 20. In a state of being attached to the rear lamp attachment portion 20, an outer side portion of the rear combination lamp 30 in the vehicle width direction is curved to the front side in the vehicle longitudinal direction from the rear end portion 12 and extends to the side of a vehicle side portion 14.

Here, the rear combination lamp 30 is an assembly in which a brake lamp, a rear lamp, a turn signal lamp (a directional indicator), and the like are combined. A resinous translucent cover 32 is a part of an exterior design of the vehicle 10. As depicted in FIG. 4, plural light sources are provided on the inner side of the cover 32. In this embodiment, an LED lamp 34 that include plural LEDs is used as the light source.

As depicted in FIG. 1 to FIG. 4, a side outer panel 40 constitutes an exterior surface of the vehicle side portion 14 in a rear portion of the vehicle. In addition, as depicted in FIG. 3, an outer peripheral edge of a housing panel 50 is joined to the side outer panel 40. The rear lamp attachment portion 20, to which the above-described rear combination lamp 30 is attached (see FIG. 1 and FIG. 2), includes the side outer panel 40 and the housing panel 50.

More specifically, as depicted in FIG. 3 and FIG. 4, a drawing structural surface (drawing shaped portion) 42 of the side outer panel 40 is drawn inward in the vehicle width direction and constitutes a vehicle front side of the rear lamp attachment portion 20. The housing panel 50 constitutes a vehicle rear side of the rear lamp attachment portion 20.

A fixed surface (bending structural surface) 44 that is bent inward in the vehicle width direction is provided at a rear end of the drawing structural surface 42 of the side outer panel 40. This fixed surface 44 has a reference hole 46 that serves as a reference position in a body manufacturing process (see FIG. 3). In addition, the drawing structural surface 42 of the side outer panel 40 has an outer panel side attachment hole 48 that is used to attach the rear combination lamp 30 (see FIG. 1 and FIG. 2).

Meanwhile, the housing panel 50 has a side surface portion 60 and a rear surface portion 52. The side surface portion 60 extends forward along the vehicle longitudinal direction, and a front end portion 62 thereof that is bent outwardly in the vehicle width direction is welded and joined to the fixed surface 44 of the side outer panel 40.

In addition, a width of the side surface portion 60 of the housing panel 50 (and the drawing structural surface 42 of the side outer panel 40) in the vehicle vertical direction is reduced from a rear end of the side surface portion 60 to a front end of the side surface portion 60 in the vehicle longitudinal direction (see FIG. 3).

The rear surface portion 52 of the housing panel 50 is curved from the rear end of the side surface portion 60 and extends inward in the vehicle width direction and rearward in the vehicle longitudinal direction. In other words, the rear surface portion 52 is arranged obliquely with respect to the vehicle width direction (see FIG. 4). Furthermore, the rear surface portion 52 has a housing side attachment hole 54 and a service hole 56. The housing side attachment hole 54 is used to attach the rear combination lamp 30 (also see FIG. 1 and FIG. 2), and the service hole 56 is used to exchange the LED lamp 34 (see FIG. 4). These housing side attachment hole 54 and the service hole 56 are formed such that a hole (an axial) direction thereof (see an arrow G in FIG. 4) is orthogonal to the rear surface portion 52, that is, oblique with respect to the vehicle longitudinal direction (see FIG. 4).

As depicted in FIG. 4, the above-described LED lamps 34 are arranged outside the rear surface portion 52 of the housing panel 50 and outside the side surface portion 60, which reaches to the vehicle side portion 14 side and extends along the vehicle longitudinal direction. Thus, as depicted in FIG. 2 to FIG. 4, a light emitting region S of the rear combination lamp 30 reaches to the side portion that reaches to the vehicle side portion 14 side.

The rear combination lamp 30 that is depicted in FIG. 1, FIG. 2, and FIG. 4 is attached to the rear lamp attachment portion 20 from the vehicle rear side toward the vehicle front side. Noted that, as depicted in FIG. 4, an accurate attachment direction of the rear combination lamp 30 (also see FIG. 1 and FIG. 2) is oblique to the hole (axial) direction of the housing side attachment hole 54 and the service hole 56 (see the arrow G), which are formed in the rear surface portion 52 of the housing panel 50, that is, the vehicle longitudinal direction.

A description will hereinafter be made on operations and effects of this embodiment. As depicted in FIG. 3 and FIG. 4, the rear lamp attachment portion 20 (also see FIG. 1) that is recessed inward in the vehicle width direction includes the side outer panel 40 and the housing panel 50. The housing panel 50 has the front end portion 62 of the side surface portion 60 that is welded and joined to the fixed surface 44. The fixed surface 44 is provided at the rear end of the drawing structural surface 42 of the side outer panel 40. Meanwhile, the front end portion 62 reaches to the vehicle side portion 14 side and extends forward in the vehicle longitudinal direction along the vehicle side portion 14.

As depicted in FIG. 4, the housing panel 50 is formed to be drawn deeper than the side outer panel 40 since the housing panel 50 has no design restriction or a relatively less design restriction. For this reason, the LED lamp 34 is also arranged in the side surface portion 60 of the housing panel 50 that reaches to the vehicle side portion 14 side. In other words, in the rear lamp attachment portion 20, the LED lamp 34 is also arranged in a side portion 38 of the rear combination lamp 30 that reaches to the vehicle side portion 14 side. Thus, the light emitting region S of the rear combination lamp 30 reaches to the side portion that reaches to the vehicle side portion 14.

The reference hole 46 (see FIG. 3) is formed in the fixed surface 44, which is provided at the rear end of the drawing structural surface 42 of the side outer panel 40. The outer panel side attachment hole 48 is formed in the drawing structural surface 42. The fixed surface 44 of the side outer panel 40 only needs to be large enough to enable formation of the reference hole 46 and a joining margin with the front end portion 62 of the side surface portion 60 of the housing panel 50.

Accordingly, since a height of the fixed surface 44 in the vehicle vertical direction can be reduced, a range L of the drawing structural surface 42 of the side outer panel 40 in the vehicle longitudinal direction can be reduced. Consequently, the side surface portion 60 of the housing panel 50 further extends in the vehicle longitudinal direction to a degree that corresponds to the reduction in the range L, and the number of the arranged LED lamps 34 is increased. In other words, the light emitting region S further extends to the vehicle front side.

As depicted in FIG. 4, the rear surface portion 52 of the housing panel 50 is curved from the rear end of the side surface portion 60 and extends inward in the vehicle width direction and rearward in the vehicle longitudinal direction. The hole direction (axial direction) of the housing side attachment hole 54 and the service hole 56, which are formed in the rear surface portion 52, is orthogonal to the rear surface portion 52 (see the arrow G in FIG. 4). Accordingly, since drawing depth H of the entire housing panel 50 can be suppressed from increasing, the housing panel 50 can easily be shaped.

As depicted in FIG. 3, a height of the side surface portion 60 in the vehicle vertical direction of the housing panel 50 (and the drawing structural surface 42 of the side outer panel 40) is reduced from the rear end of the side surface portion 60 to the front end of the side surface portion 60 in the vehicle longitudinal direction. In other words, the height of the side surface portion 60 is reduced in such a direction that the rear combination lamp 30 (see FIG. 1 and FIG. 2) is attached to the rear lamp attachment portion 20 from the vehicle rear side toward the vehicle front side. Accordingly, the rear combination lamp 30 can easily be positioned, and assemblability thereof is enhanced.

A description will be made on a body structure of a vehicular rear lamp attachment portion of a comparative example by using FIG. 5 and FIG. 6.

Figure 5:
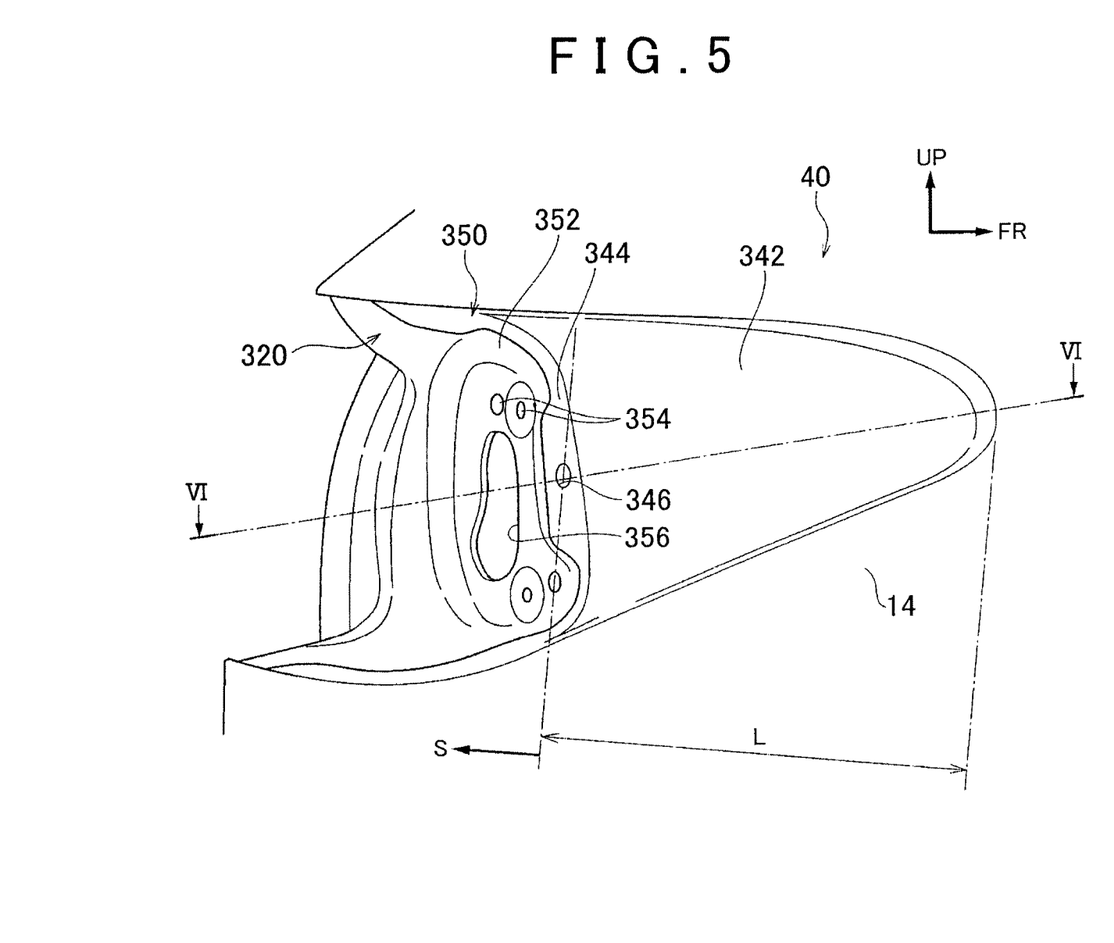
FIG. 5 is a side view of a body structure of a rear lamp attachment portion in a comparative example.
Figure 6:
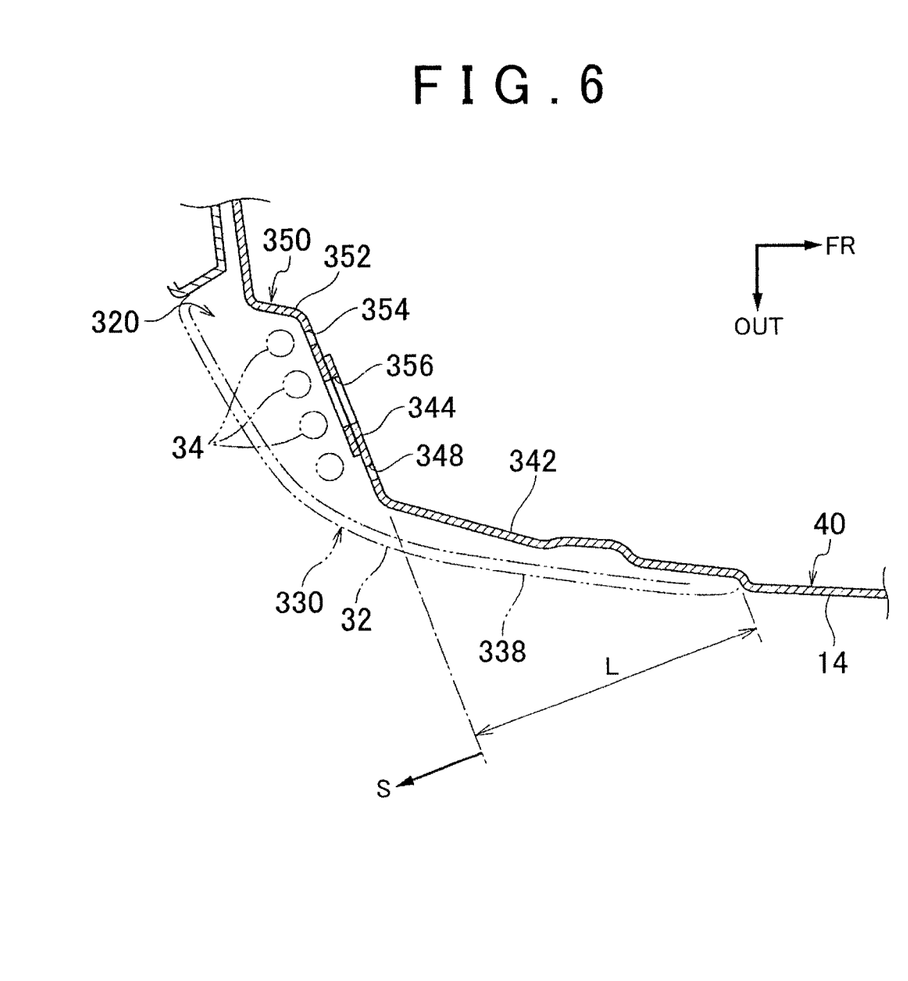
FIG. 6 is a horizontal cross-sectional view that is taken along line VI-VI in FIG. 5 and corresponds to FIG. 4.

FIG. 5 is a side view of the body structure of the rear lamp attachment portion of the comparative example. The side view in FIG. 5 corresponds to the side view in FIG. 3. FIG. 6 is a horizontal cross-sectional view that is taken along line VI-VI in FIG. 5. The horizontal cross-sectional view in FIG. 6 corresponds to the horizontal cross-sectional view in FIG. 4. As depicted in FIG. 5 and FIG. 6, a rear lamp attachment portion 320 of the comparative example includes the side outer panel 40 and a housing panel 350. More specifically, the rear lamp attachment portion 320 has a drawing structural surface (drawing shaped portion) 342 of the side outer panel 40 that is provided on the vehicle front side and the housing panel 350 that is provided in the vehicle rear side. The drawing structural surface (drawing shaped portion) 342 is drawn inward in the vehicle width direction.

A fixed surface (bending structural surface) 344 that is bent inward in the vehicle width direction is provided at a rear end of the drawing structural surface 342 of the side outer panel 40. In addition, this fixed surface 344 has a reference hole 346 and an attachment hole 354. The reference hole 346 serves as a reference position in the body manufacturing process. The attachment hole 354 is used to attach a rear combination lamp 330 (see FIG. 6).

Meanwhile, the housing panel 350 has a rear surface portion 352 that extends along the vehicle width direction. The rear surface portion 352 is welded and joined to the fixed surface 344 of the side outer panel 40. The rear surface portion 352 has the attachment hole 354 and a service hole 356.

In the case of the rear lamp attachment portion 320 of the comparative example with such a structure, the fixed surface 344 of the side outer panel 40 has the reference hole 346 and the attachment hole 354, in addition to a joining margin with the rear surface portion 352 of the housing panel 350. For this reason, a height of the fixed surface 344 in the vehicle vertical direction is increased in order to secure the size that is large enough to enable formation of these components. Then, when the height of the fixed surface 344 of the side outer panel 40 in the vehicle vertical direction is increased, the range L of the drawing structural surface (drawing shaped portion) 342 in the vehicle longitudinal direction is increased upon shaping.

Only the drawing structural surface 342 of the side outer panel 40 constitutes a side portion of the rear lamp attachment portion 320. The rear lamp attachment portion 320 corresponds to a side portion 338 of the rear combination lamp 330 (see FIG. 6) that reaches to the vehicle side portion 14 side. The drawing depth of the side outer panel 40 is limited due to a design restriction or a processing restriction. Thus, the LED lamp (light source) 34 (see FIG. 6) cannot be arranged in the drawing structural surface 342. Since the LED lamp 34 (see FIG. 6) is only arranged outside the rear surface portion 352 of the housing panel 350 (and the fixed surface 344), the light emitting region S is small in size, and the light emitting region S does not reach to the side portion that reaches to the vehicle side portion 14 side.

On the contrary, as depicted in FIG. 3 and FIG. 4, in the body structure of the vehicular rear lamp attachment portion to which the present invention is applied, the housing panel 50 has the side surface portion 60 that extends forward along the vehicle longitudinal direction. Since the housing panel 50 can be formed to be drawn deeper than the side outer panel 40 due to the lack of the design restriction, the LED lamp 34 can be arranged outside the side surface portion 60 of the housing panel 50 that reaches to the vehicle side portion 14 side. Thus, the light emitting region S of the rear combination lamp 30 reaches to the side portion that reaches to the vehicle side portion 14 side (see and compare FIG. 3 with FIG. 5 and FIG. 4 with FIG. 6).

In addition, the reference hole 46 is formed in the fixed surface 44 that is provided at the rear end of the drawing structural surface 42 of the side outer panel 40. The outer panel side attachment hole 48 is formed in the drawing structural surface 42. Accordingly, compared to the case where the attachment hole 354 is formed in the fixed surface 344 as in the comparative example, the height of the fixed surface 44 in the vehicle vertical direction can be reduced. Thus, the range L of the drawing structural surface 42 of the side outer panel 40 in the vehicle longitudinal direction can be reduced for the reduction in the height of the fixed surface 44 (see and compare FIG. 3 with FIG. 5 and FIG. 4 with FIG. 6).

Noted that the present invention is not limited to the above embodiment. For example, the LED lamp 34 is the light source in the above embodiment; however, the light source is not limited thereto. The light source other than the LED lamp, such as a light bulb, may be used. Various modes can be adopted for the present invention within a range of the gist of the present invention.

What is claimed is:

1. A body structure of a vehicular rear lamp attachment portion comprising:
    a drawing structural surface of a side outer panel, the drawing structural surface being provided at both end portions of a vehicle rear end portion in a vehicle width direction, being drawn inward in the vehicle width direction, and having a fixed surface at a rear end of the drawing structural surface;
    a housing panel that has a side surface portion, a front end portion, and a rear surface portion, the side surface portion extending forward along a vehicle longitudinal direction, the front end portion being joined to the fixed surface, and the rear surface portion being curved inward from a rear end of the side surface portion in the vehicle width direction relative to the side surface portion and extending rearward in the vehicle longitudinal direction; and
    a rear lamp including a plurality of LED light sources arranged outside of the rear surface portion in the vehicle width direction and arranged outside of the side surface portion in the vehicle width direction, the rear lamp including a light emitting region that extends from the vehicle rear end portion to a vehicle side portion, wherein
    the front end portion is joined to the side surface portion and extends outwardly from the side surface portion in the vehicle width direction to form a curvature, and
    the fixed surface extends along the front end portion and at least one of the plurality of LED light sources is arranged in the curvature defined at least by the side surface portion, the front end portion, and the fixed surface.

2. The body structure according to claim 1, wherein
    a height of the side surface portion of the housing panel in a vehicle vertical direction is reduced from the rear end of the side surface portion to a front end of the side surface portion in the vehicle longitudinal direction.

3. The body structure according to claim 1, wherein
    an inward facing portion of the front end portion is joined to the fixed surface,
    the front end portion and the side surface portion form an outward facing curve in the vehicle width direction, and
    the side surface portion and at least a part of the rear surface form an inward facing curve in the vehicle width direction.

4. The body structure according to claim 1, wherein the plurality of LED light sources includes a first set of LED light sources adjacent to the rear surface portion in the vehicle width direction and the plurality of LED light sources includes a second set of LED light sources adjacent to the side surface portion in the vehicle width direction.

5. The body structure according to claim 1, wherein the rear lamp includes a translucent cover extending from the drawing structural surface that covers the plurality of LED light sources.

6. The body structure according to claim 1, wherein
    the fixed surface of the side outer panel includes a reference hole that is a reference position in a body manufacturing process, and
    the drawing structural surface has an attachment hole to which the rear lamp is attachable.

7. The body structure according to claim 1, wherein the front end portion is welded and fixed to the fixed surface of the drawing structural surf ace along a line of extension of both the front end portion and the fixed surface.

* * * * *